April 29, 1941.     S. E. BLODGETT     2,240,089

SWITCH FOR SIGNAL LIGHTS

Filed July 15, 1940

Selwyn E. Blodgett, INVENTOR

BY Victor J. Evans & Co.

ATTORNEYS

Patented Apr. 29, 1941

2,240,089

UNITED STATES PATENT OFFICE 2,240,089

SWITCH FOR SIGNAL LIGHTS

Selwyn E. Blodgett, Bakersfield, Calif.

Application July 15, 1940, Serial No. 345,671

2 Claims. (Cl. 200—153)

This invention relates to a switch for signal lights and has for an object to provide a switch which may be secured to the inner side of the door of a motor vehicle or positioned in a suitable manner on the door most convenient to be operated by the driver's arm when making an arm signal so that the circuit of a signal light for illuminating the driver's arm will be closed without the driver's attention being distracted from driving the vehicle carefully in traffic.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
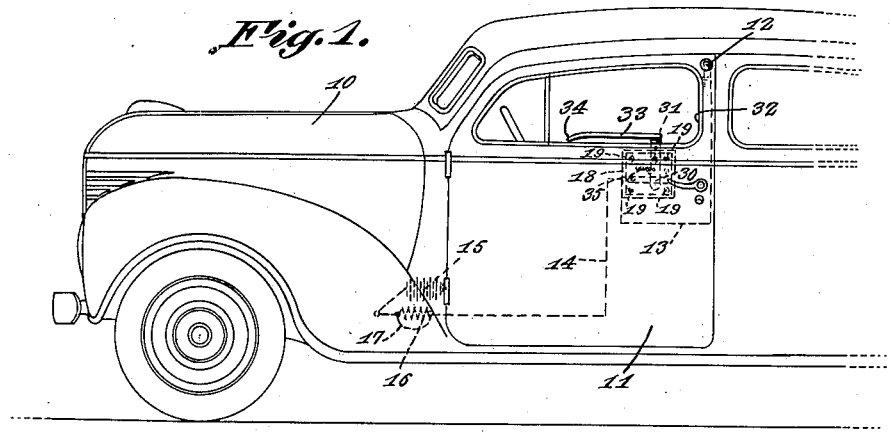
Figure 1 is a fragmentary side elevation of a motor vehicle showing a switch constructed in accordance with the invention applied thereto for closing a circuit to a signal light.
Figure 2:
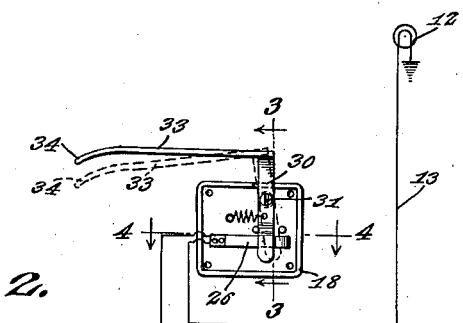
Figure 2 is a side elevation of the switch and showing the electrical connections to the battery and to the signal light.
Figure 3:
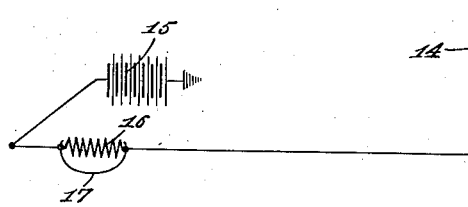
Figure 3 is an enlarged cross sectional view taken on the line 3—3 of Figure 2.
Figure 3:
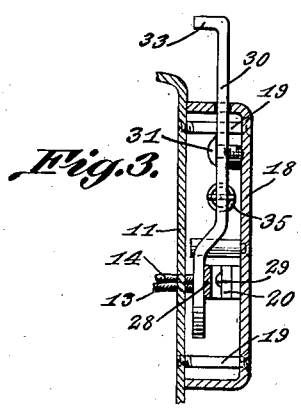

Referring now to the drawing in which like characters of reference designate similar parts in the various views, 10 designates a motor vehicle and 11 the door on the driver's side thereof. For illuminating the driver's arm when signalling, a signal light 12 is disposed on the door frame in position to illuminate the driver's arm when making a signal through the open window.

One terminal of the light may be grounded on the vehicle and the other terminal may be connected to a circuit wire 13 which is connected to one contact of a switch hereinafter described in detail, the other contact of the switch being connected by a wire 14 to the vehicle storage battery 15. A helical spring 16 is disposed to connect the ends of a loop 17 formed in the wire 14 to permit opening and closing of the door 11.

Figure 4:
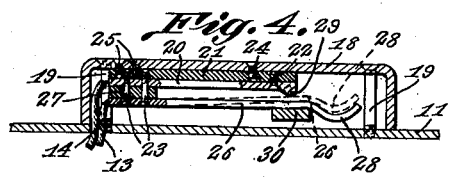
Figure 4 is an enlarged longitudinal sectional view taken on the line 4—4 of Figure 2.

The switch is adapted to be secured to the door in a position most convenient for operation by the driver's arm when the arm is extended to signalling position and comprises a casing 18 which is secured to the door by screw bolts 19, or other connectors. Within the casing a switch contact 20 is secured to a strip of insulating material 21 by screws 22 and 23 and the strip of insulating material is secured to the casing by screws 24 and 25, as best shown in Figure 4.

A spring switch contact 26 extends longitudinally of the stationary switch contact 20 and is insulated from the latter by a strip of insulating material 27. The before-mentioned screws 23 secure the spring contact 26 and the insulating strip 27 to the insulating strip 21. The spring switch contact is provided with an arcuate cam tip 28 which is adapted to be engaged by the hereinafter described switch lever to push the spring contact 26 into engagement with a contact point 29 which projects from the face of the stationary switch contact 20 to close the signal circuit at this point to the light 12.

A lever 30 extends downwardly in the casing 18 and is pivotally connected intermediate its ends to the casing by a pivot pin 31. The lower end of the lever projects downwardly across the spring switch contact 26 at the curved cam end 28. The upper end of the lever projects above the lower part of the window opening 32 of the left front door of the motor vehicle and is provided with an arm 33 which extends forwardly along the lower edge of the window opening so as to be easily depressed by the operator's arm in signalling position. The end of the arm is curved downwardly as shown at 34 to contact with the lower edge portions of the window opening and limit swinging movement of the lever 30.

A helical spring 35 is secured to the lever below the pivot 31 thereof and is secured to the casing 18 to normally hold the lever out of contact with the curved end 28 of the spring switch contact 26.

In operation when the arm of the driver moves the lever downwardly when making an arm signal the downward movement of the arm operates the lever 30 against the tension of the spring 35 in a direction to engage the lower end of the lever with the curved cam tip 28 of the spring contact and push the contact into circuit closing position with the contact point 29 of the stationary switch contact 20. The circuit to the light 12 is thus closed to energize the light for illuminating the driver's signalling arm.

From the above description it is thought that the construction and operation of the invention will be fully understood without further explanation.

What is claimed is:

1. In an automatic signal light, a switch adapted to be located on the driver's door of a motor vehicle to be actuated by the driver's arm in signalling position comprising, a casing, means for securing the casing to the motor vehicle door at the window opening thereof, a pair of contacts in the casing insulated from each other and from the door, one of the contacts being resilient and extending longitudinally of and being of greater length than the other contact, said contacts being normally out of engagement with each other, means for connecting one of the contacts to a signal circuit, means for connecting the other contact to a storage battery, the resilient contact being provided with a curved cam tip, a lever pivoted on the casing and having one end overlapping the resilient contact adjacent to said curved cam tip, a spring connected to the casing and to the lever for normally holding the lever out of engagement with said curved cam tip, and an arm connected to the upper end of the lever adapted to be depressed by the driver's arm in signalling position to rock the lever into engagement with said curved cam tip of the resilient contact and move the resilient contact into circuit closing position with the other contact.

2. The structure recited in claim 1 and in which one of the contacts is provided with a contact point extending toward and adapted to be engaged by said curved cam tip of the other contact.

SELWYN E. BLODGETT.